(12) United States Patent
Langlois et al.

(10) Patent No.: US 10,195,780 B2
(45) Date of Patent: Feb. 5, 2019

(54) MOLDING DEVICE INCLUDING A ONE-PIECE MOLD BOTTOM INCLUDING A HEAT-EXCHANGE CAVITY MATCHING A MOLDING SURFACE

(71) Applicant: SIDEL PARTICIPATIONS, Octeville sur Mer (FR)

(72) Inventors: Jean-Christophe Langlois, Octeville sur Mer (FR); Laurent Charrier, Octeville sur Mer (FR); Michel Boukobza, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 197 days.

(21) Appl. No.: 15/106,115

(22) PCT Filed: Dec. 4, 2014

(86) PCT No.: PCT/FR2014/053160
§ 371 (c)(1),
(2) Date: Jun. 17, 2016

(87) PCT Pub. No.: WO2015/092196
PCT Pub. Date: Jun. 25, 2015

(65) Prior Publication Data
US 2016/0325483 A1 Nov. 10, 2016

(30) Foreign Application Priority Data
Dec. 19, 2013 (FR) ...................................... 13 63086

(51) Int. Cl.
B29C 49/48 (2006.01)
B33Y 80/00 (2015.01)
(Continued)

(52) U.S. Cl.
CPC ........ B29C 49/4823 (2013.01); B22F 3/1055 (2013.01); B22F 5/007 (2013.01);
(Continued)

(58) Field of Classification Search
CPC .......... B29C 49/4823; B29C 2049/483; B29C 2049/4848; B29C 2049/4853;
(Continued)

(56) References Cited

U.S. PATENT DOCUMENTS 3,768,948 A * 10/1973 Horberg, Jr. ........ B29C 49/4823
249/79
3,784,344 A * 1/1974 Korsch ................... B29C 33/04
425/526
(Continued)

FOREIGN PATENT DOCUMENTS

| EP | 0 742 094 A1 | 11/1996 |
|---|---|---|
| EP | 2 043 840 B1 | 9/2015 |

(Continued)

OTHER PUBLICATIONS

International Search Report, dated Feb. 12, 2015, from corresponding PCT Application.

*Primary Examiner* — Robert B Davis
(74) *Attorney, Agent, or Firm* — Young & Thompson

(57) ABSTRACT

A one-piece mold bottom (7) for a mold (1) for manufacturing containers, includes a molding wall (8) having a raised molding surface (9) bearing the imprint of at least one portion of a container bottom. The mold bottom (7) includes a cavity (27) integrally formed with the mold bottom (7), defined by a surface casing (29) defined entirely by the mold bottom (7) and including an inner surface (31) of the molding wall (8), opposite the molding surface (9) and matching the raised pattern thereof, and a rear surface (32, 33) opposite the inner surface (31). The mold bottom (7) is
(Continued)

provided with at least one pair of openings (35; 37) leading into the cavity (27) for circulating a heat-transfer fluid inside the cavity.

17 Claims, 4 Drawing Sheets

(51) Int. Cl.
| | | |
|---|---|---|
| *B29C 33/38* | (2006.01) | |
| *B22F 3/105* | (2006.01) | |
| *B22F 5/00* | (2006.01) | |
| *B33Y 10/00* | (2015.01) | |
| *B29C 49/06* | (2006.01) | |
| *B29L 31/00* | (2006.01) | |

(52) U.S. Cl.
CPC .......... *B29C 33/3842* (2013.01); *B29C 49/48* (2013.01); *B33Y 10/00* (2014.12); *B33Y 80/00* (2014.12); *B29C 49/06* (2013.01); *B29C 2049/483* (2013.01); *B29C 2049/4853* (2013.01); *B29C 2049/4892* (2013.01); *B29C 2049/4897* (2013.01); *B29K 2905/02* (2013.01); *B29K 2905/12* (2013.01); *B29L 2031/7158* (2013.01); *B29L 2031/757* (2013.01)

(58) Field of Classification Search
CPC ..... B29C 2049/4892; B29C 2049/4897; B22F 5/007; B22F 3/1055
See application file for complete search history.

(56) References Cited

U.S. PATENT DOCUMENTS

| | | | |
|---|---|---|---|
| 3,843,286 A * | 10/1974 | Horberg, Jr. ............ | B29C 49/56 |
| | | | 425/183 |
| 5,458,825 A * | 10/1995 | Grolman ............ | B29C 33/3842 |
| | | | 264/225 |
| 5,762,981 A | 6/1998 | Nitsche | |
| 5,775,402 A * | 7/1998 | Sachs ..................... | B22C 9/065 |
| | | | 164/4.1 |
| 5,971,740 A | 10/1999 | Rees | |
| 6,428,302 B1 | 8/2002 | Tsau | |
| 6,656,409 B1 * | 12/2003 | Keicher ................ | B23P 15/246 |
| | | | 219/121.66 |
| 6,843,646 B2 * | 1/2005 | Ryan ...................... | B29C 33/04 |
| | | | 249/102 |
| 7,025,584 B2 | 4/2006 | Tsau | |
| 2002/0011550 A1 * | 1/2002 | Herzbach .................. | B22F 5/10 |
| | | | 249/79 |
| 2002/0165634 A1 * | 11/2002 | Skszek ................... | B23K 26/34 |
| | | | 700/118 |
| 2006/0170138 A1 | 8/2006 | Miller et al. | |
| 2007/0026098 A1 | 2/2007 | Lemaistre et al. | |
| 2008/0181982 A1 | 7/2008 | Lane | |
| 2010/0104681 A1 | 4/2010 | Dagorn | |
| 2011/0223275 A1 | 9/2011 | Dagorn et al. | |
| 2013/0171019 A1 | 7/2013 | Gessler et al. | |
| 2014/0377394 A1 | 12/2014 | Le Pechour et al. | |

FOREIGN PATENT DOCUMENTS

| | | |
|---|---|---|
| FR | 2 856 333 A1 | 12/2004 |
| WO | 2005/002820 A1 | 1/2005 |
| WO | 2008/000938 A2 | 1/2008 |
| WO | 2013/093335 A1 | 6/2013 |

* cited by examiner

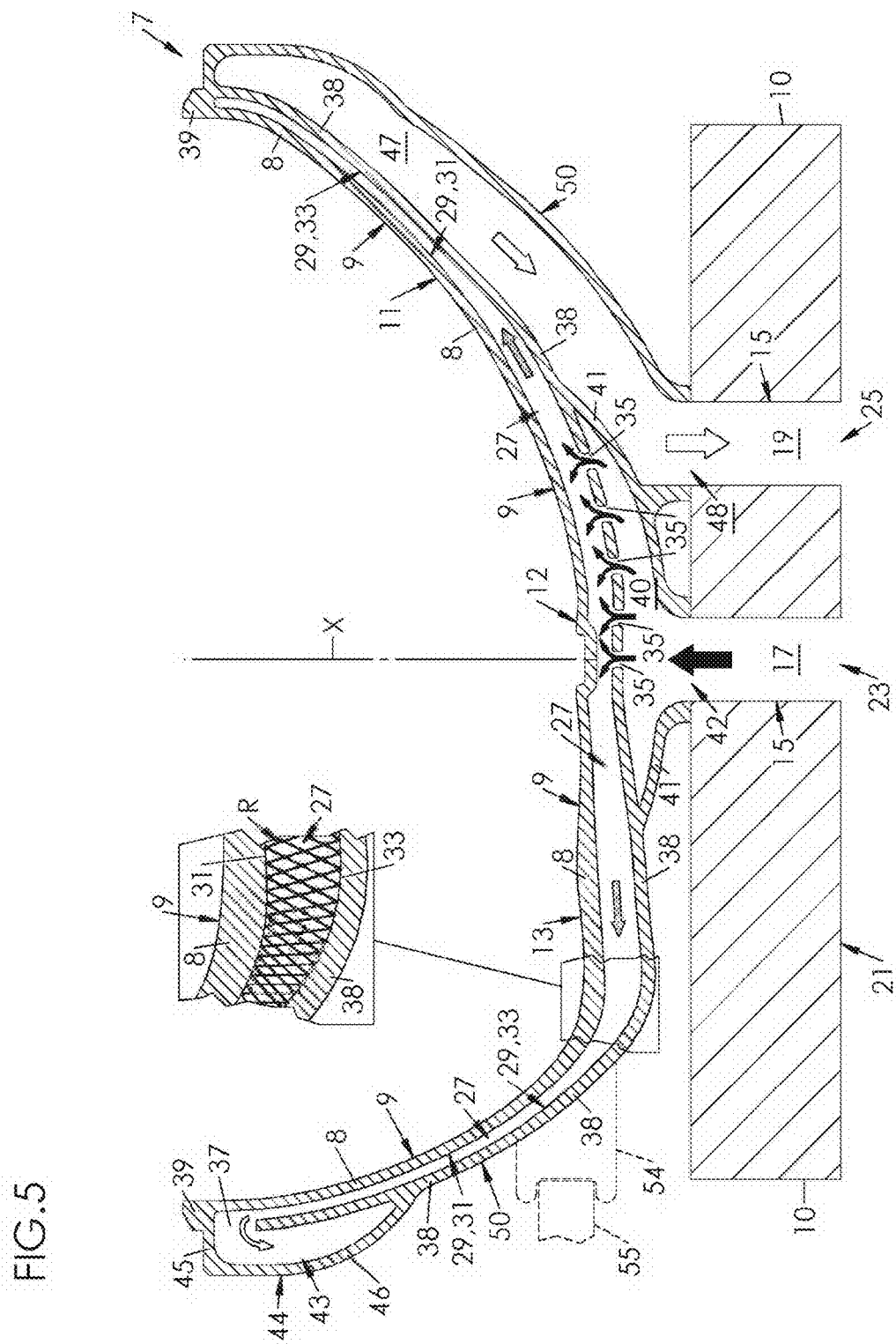

MOLDING DEVICE INCLUDING A ONE-PIECE MOLD BOTTOM INCLUDING A HEAT-EXCHANGE CAVITY MATCHING A MOLDING SURFACE

BACKGROUND OF THE INVENTION

Field of the Invention

The invention relates to the forming of containers from parisons made of plastic material by blow molding or stretch blow molding in a mold bearing the imprint of a model of the container to be formed. The term "parison" refers to not only a preform (ordinarily obtained by injection), but also an intermediate container that has undergone a preliminary blow molding operation starting from a preform.

Description of the Related Art

A mold usually comprises multiple one-piece elements, each having a molding surface bearing the imprint of at least a portion of the container. Thus, a mold that is designed for forming containers comprises a side wall bearing the imprint of a body and a shoulder of the container, generally divided into two mutually articulated half-molds for making it possible to insert a parison into the mold and a mold bottom bearing the imprint of a bottom of the container, with this mold bottom being positioned in an opening made between the half-molds opposite the shoulder. For some containers having particular local shapes (for example protrusions or recessed reserved places forming a handle), the mold can comprise movable inserts bearing the imprints of these shapes.

The molds are generally regulated thermally in such a way as to keep them at a stable temperature making it possible either to cool the containers at the end of forming (general case), or, in certain cases, in contrast to heat them (case of the containers designed to be filled with hot contents—this is then called thermofixation, or heat-setting in English).

In the two cases, a well-known technique consists in making a fluid circulate in the mold (in gaseous or liquid form, in general water or oil) via a fluid circuit that is partially formed in the mold elements (half-molds, mold bottom, possible inserts, supports). For cooling, the fluid is introduced into the fluid circuit at a relatively low temperature, typically on the order of 10° C. For heating, the fluid is introduced into the fluid circuit at a relatively high temperature, typically on the order of 140° C. In the case of heating, an alternative technique for thermal regulation consists in integrating electrical resistors into the wall of the mold, as proposed in the international application WO 2013/093335 (Sidel Participations).

It is easily understood that the thermal regulation is more effective the larger the exchange surfaces (defined by the fluid circuit) between the coolant and the material of the container. A common objective, for the manufacturers of molds, is therefore to maximize the exchange surfaces defined by the fluid circuit. More specifically, for reasons of rationalization of the manufacturing of molds and limitation of the loss of material, the objective is to maximize the surface/volume ratio of the fluid circuit. This objective, however, comes up against multiple limitations, in particular:

Machining constraints (linked to the techniques used: molding, turning, milling, electroerosion, etc.),
Manufacturing tolerances associated with the necessary sealing of the fluid circuit with the interfaces between the different parts composing the mold elements,
The mechanical strength of the molds (which is advantageously maximized),
The consumption of coolant (which is advantageously minimized),
The space requirement constraints, with the environment of a blow molding mold being particularly bulky.

The mold bottom is a good nexus of the problems arising from heat regulation because the shape of its imprint is generally complex, its volume is limited, and it is often independent of the half-molds (which involves an independent fluid circuit with its own feed and drain pipes connected to hoses). A typical example of the mold bottom is presented in the document EP 0 742 094 (Asahi): this mold bottom is equipped with a fluid circuit (in this case for cooling), of which it is indicated that it is machined as close as possible to the surface in such a way as to maintain good cooling efficiency.

The technique that consists in penetrating the transverse channels in the bottom (which it is then necessary to connect) may be suitable when, as in the example illustrated in this document, the impression surface is flat. By contrast, as soon as this surface is raised, it is no longer possible to bring the channels close to the surface, at the risk of running into the latter. At best, it is possible, by penetrating the channels both obliquely and radially, to follow the raised pattern roughly (and only locally), as illustrated in the U.S. patents U.S. Pat. No. 5,971,740 (Rees) and U.S. Pat. No. 5,762,981 (Wentworth). This technique, however, does not make it possible to carry out homogeneous heat exchanges, with the parts of the bottom of the container located perpendicular to the channels enjoying better cooling (or conversely better heating) than the parts that are offset angularly from the channels.

Another technique, designed to improve the efficiency (and more specifically the homogeneity) of the heat exchanges, consists in making in the mold bottom, by milling, a single groove that has concentric circular portions connected by radial straight portions to form, roughly, a single channel in a continuous coil shape in which the fluid enters through a central opening to exit from it via a peripheral opening.

Such a structure, presented in the document U.S. Pat. No. 7,025,584 (Wentworth), which also calls for connecting a dividing plate equipped with projecting pegs designed to form baffles in the channel, is not without its drawbacks either, however.

In the first place, in the case of a molding surface lacking symmetry of revolution, the coil shape of the channel does not solve the problem of the lack of homogeneity of the heat exchange. Typically, in a mold bottom bearing the imprint of a petal-shaped bottom, whose raised pattern is particularly complex, the raised patterns that correspond to the feet, closer to the channel, inevitably enjoy a better heat exchange than the raised patterns corresponding to the valleys, relatively farther from the channel.

In the second place, the production in a coil of the channel (instead of a series of radial channels) induces a gradual reduction of the heat capacity of the fluid along the channel, where the zones whose distance (measured in the curvilinear abscissa along the channel) from the central opening is small offer better heat exchange capacity than the zones whose distance from the central opening is relatively larger. This geometry does not pose a problem in the central zone of the bottom, which should in general enjoy maximum heat exchange, regardless of whether it is to cool it, as in the case of an ordinary container designed for plain water or, by contrast, to heat it, as in the case of a heat-set container. By contrast, this geometry poses problems in the area of similar peripheral zones (for example, the impressions of feet in a petal-shaped bottom), whose radial distance from the center of the bottom is identical and which should receive from (or give to) the coolant the same number of calories, but which because of their different curvilinear distance from the center (measured along the channel), receive (or give) a different number of calories taking into account the gradual exhaustion of the heat capacities of the coolant.

In the third place, the sealing of such a mold bottom is difficult to ensure. Admittedly, seals (in particular O-ring seals) are inserted into the interfaces between the different parts, but taking into account heat cycles, these seals undergo an accelerated fatigue that results in leaks. This gives rise to frequent maintenance operations that interrupt the production.

In the fourth place, the manufacturing of this mold bottom is long and complex. At a minimum, it involves a first operation for producing a parison (by molding or by machining) of the one-piece mold bottom element, a second operation for producing (by milling) the groove, a third operation for producing (by machining) a connected plate serving as a cover to the fluid circuit, and then a fourth operation for assembly (by screwing) of the plate on the one-piece element with at least one seal being inserted.

Several objectives are consequently targeted, individually or in a group:
  Improving the homogeneity of heat exchanges in a mold bottom and even, preferably, ensuring these heat exchanges according to a predetermined profile regardless of the raised pattern of the molding surface,
  Maximizing the yield of the heat exchanges for purposes of achieving energy savings, improving the quality of the containers produced, and reducing the cycle time;
  Improving the sealing of the mold bottom;
  Simplifying and accelerating the manufacturing of the mold bottom.

BRIEF SUMMARY OF THE INVENTION

For this purpose, a one-piece mold bottom is proposed, according to a first aspect, which is designed for a mold for the manufacturing of containers by blow molding or stretch blow molding from preforms made of plastic material, with this mold bottom comprising a molding wall that has a raised molding surface bearing the imprint of at least a portion of a container bottom, and a cavity enclosed in the mold bottom and delimited by a surface casing integrally defined by the mold bottom and enclosing an inner surface of the molding wall, opposite to the molding surface and conforming to the raised pattern of the latter, and a rear surface opposite the inner surface, with the mold bottom being equipped with at least one intake opening and at least one discharge opening for the circulation of the coolant of the cavity.

The one-piece production of this mold bottom with its integrated cavity makes it possible in particular to optimize the heat exchange between the fluid that circulates in the cavity and the material of the container that flattens against the molding surface during the forming.

Various additional characteristics can be provided, taken separately or in combination:
  The inner surface of the molding wall covers essentially the entire molding surface;
  The molding wall has an essentially uniform thickness;
  The molding wall has a thickness of between 0.5 mm and 5 mm, for example approximately 1 mm;
  The rear surface is carried by a secondary wall that joins the molding wall on a peripheral edge of the mold bottom;
  The intake opening is formed by a series of through holes made in the secondary wall;
  The mold bottom comprises a distribution chamber that adjoins the cavity by being separated from the latter by a central portion of the secondary wall in which the through holes are made;
  The mold bottom comprises at least one collector into which at least one discharge opening empties;
  The collector comes in the form of a peripheral annular pipe;
  The mold bottom is equipped with at least one drop into which the collector empties, and which ends in a discharge opening;
  The mold bottom comprises columns and/or a three-dimensional network connecting the inner surface of the molding wall to the rear surface.

According to a second aspect, a mold is proposed for the manufacturing of containers from parisons made of plastic material, which comprises at least one mold bottom as presented above.

According to a third aspect, a method for producing a mold bottom as presented above is proposed, with this method comprising a phase for obtaining a parison from the mold bottom by direct fabrication from a metal powder.

The parison of the mold bottom is obtained by, for example, direct additive laser construction; the metal powder is preferably a steel powder, in particular a stainless steel powder.

BRIEF DESCRIPTION OF THE DRAWINGS

Other objects and advantages of the invention will become evident from the description of an embodiment, given below with reference to the accompanying drawings, in which:

FIG. 5 is a cross-section of the element of FIG. 1, along the cutting line V-V, mounted on a base enclosing in part a feed pipe and a drain pipe.

DETAILED DESCRIPTION OF THE PREFERRED EMBODIMENTS

Figure 1:
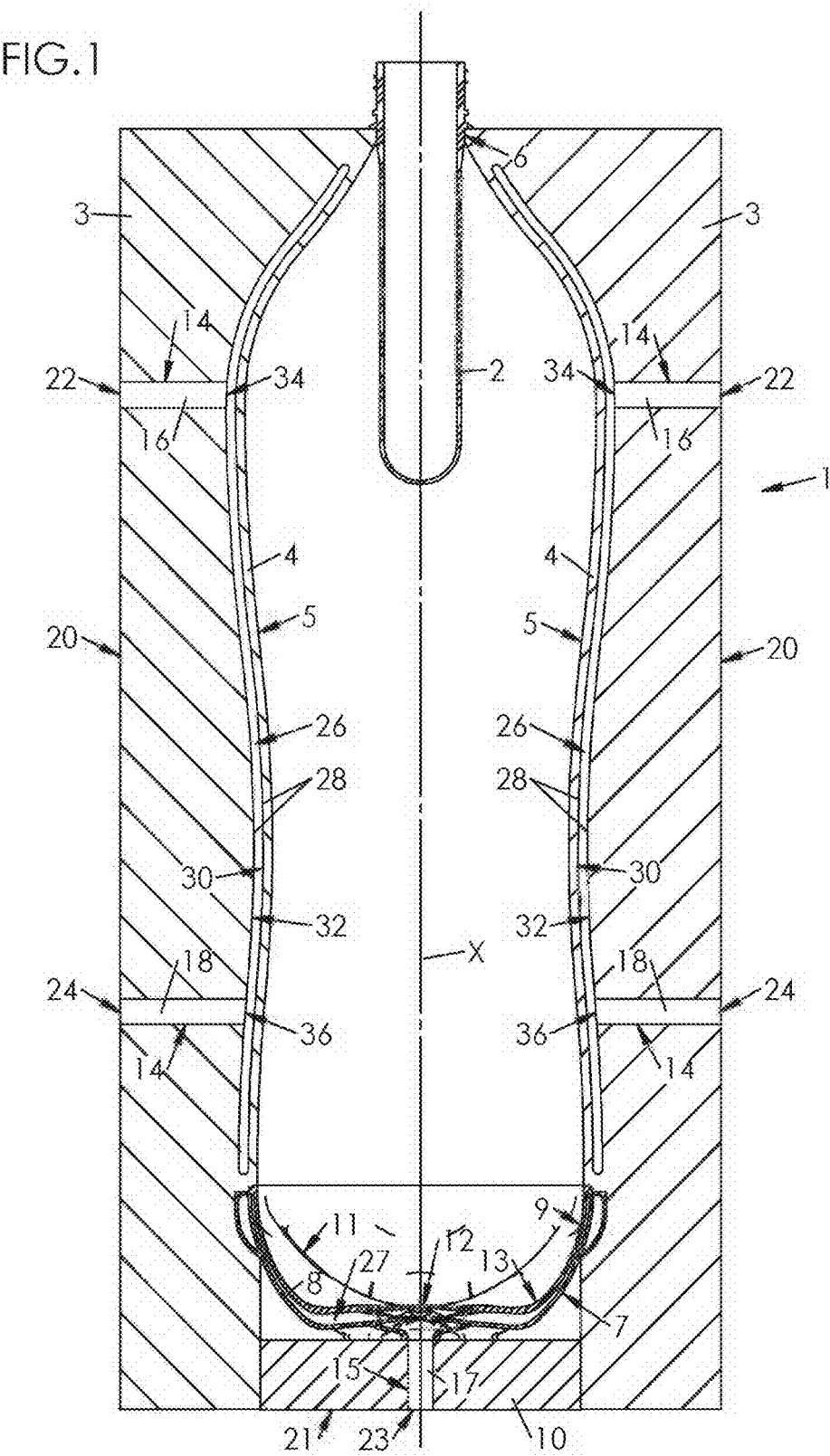
FIG. 1 is a perspective view of a mold for the forming of containers with petal-shaped bottoms, which comprises two articulated half-molds and a mold bottom.

Shown in FIG. 1 is a mold 1 for forming a container from a parison 2 made of plastic material, by blow molding or stretch blow molding.

The parison 2 can be an intermediate container that has undergone a first blow molding operation from a preform. It can also be, as in the illustrated example, a preform obtained by injection of a plastic material such as PET.

The mold 1 encloses multiple one-piece elements preferably made in a metal material, for example steel or aluminum, optionally alloyed to increase their mechanical performances and/or resistance to corrosion.

Thus, in the illustrated example, the mold encloses two half-molds 3 that are mutually articulated around a vertical X axis for allowing the insertion of the parison 2 (as described in, for example, the French patent application FR 2 856 333 or in the corresponding international application WO 05/002820), and each having a molding wall 4 defining a raised molding surface 5, bearing the imprint of a body of the container that is to be formed.

The two half-molds 3 define, at an upper end, an opening 6 through which the preform 2 extends during the forming of the container. With the two half-molds 3 being identical, the same numerical references are used interchangeably for each hereinafter.

The mold 1 also encloses a one-piece mold bottom 7 comprising a molding wall 8 that defines a raised molding surface 9 bearing the imprint of a bottom of the container. As illustrated, the mold bottom 7 can be mounted on a mold bottom support 10, called a stand. The stand 10 is movable in translation in an axial direction merged with the central axis X.

The stand 10 is only roughly shown in FIGS. 1 and 5. By way of nonlimiting example of such a stand, reference can be made to the international application WO 2008/000938 (Sidel Participations).

As a variant, the stand 10 can be integrated into the mold bottom 7, by being made in one piece with the latter. Likewise, a connector for the quick connection of tubes for feeding and draining coolant can be at least partially integrated into the stand 10, in a one-piece manner, typically in the form of female impressions in which male end fittings can snap on, provided at the ends of the feed and drain tubes.

Figure 2:
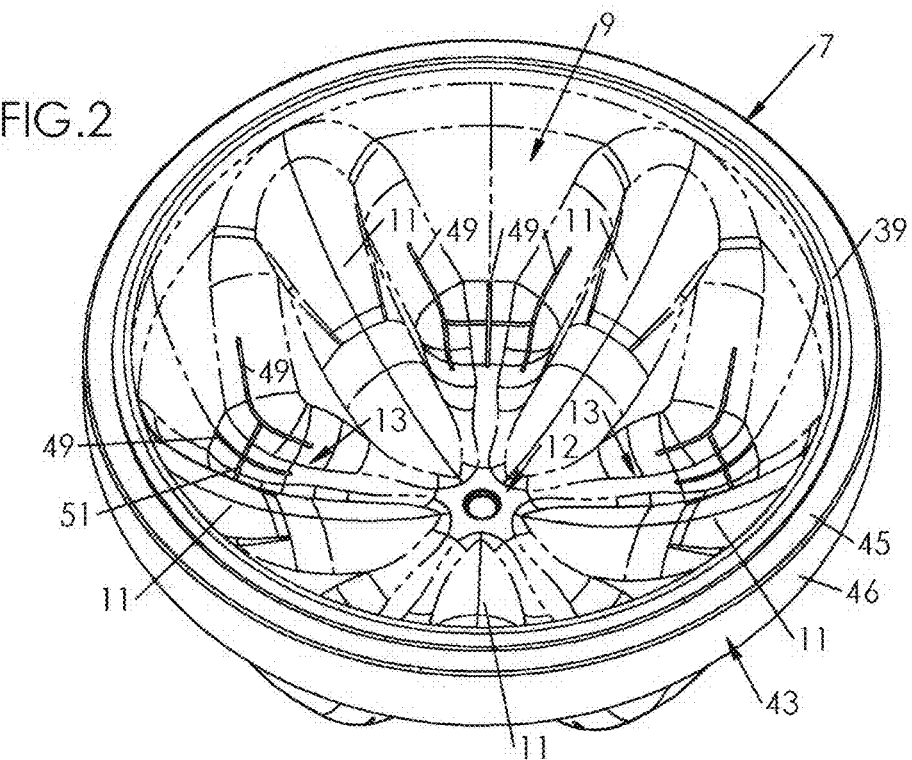
FIG. 2 is a perspective view of the mold bottom.
Figure 3:
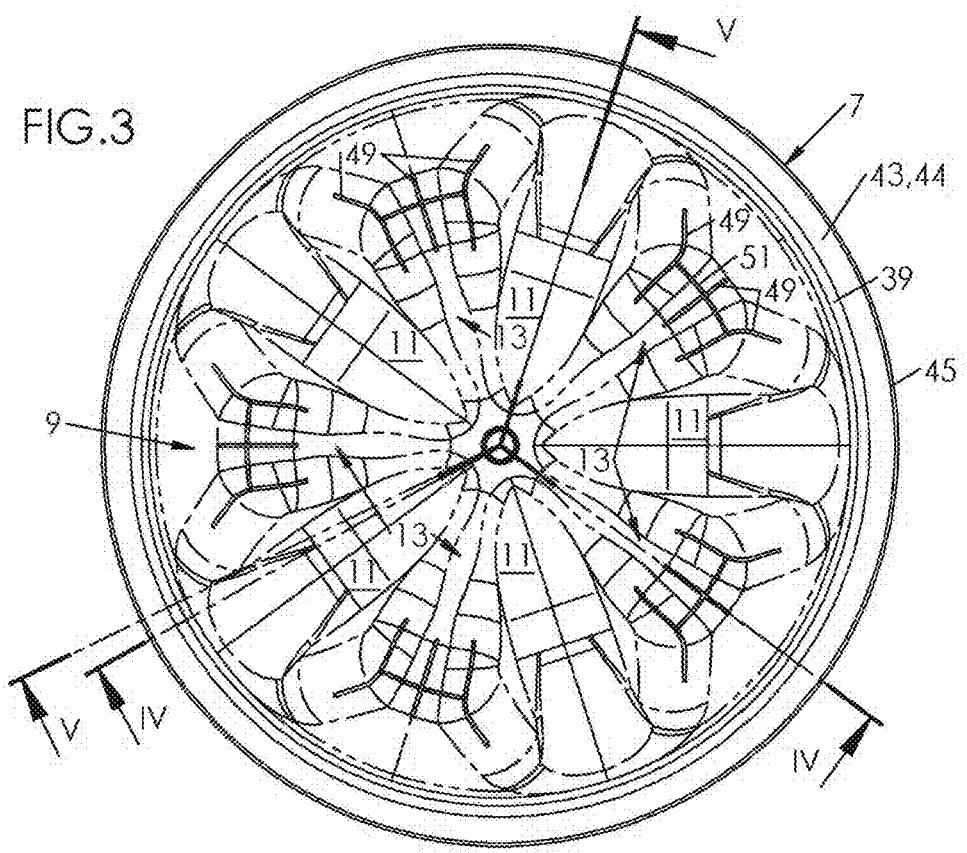
FIG. 3 is a top view of the mold bottom.
Figure 4:
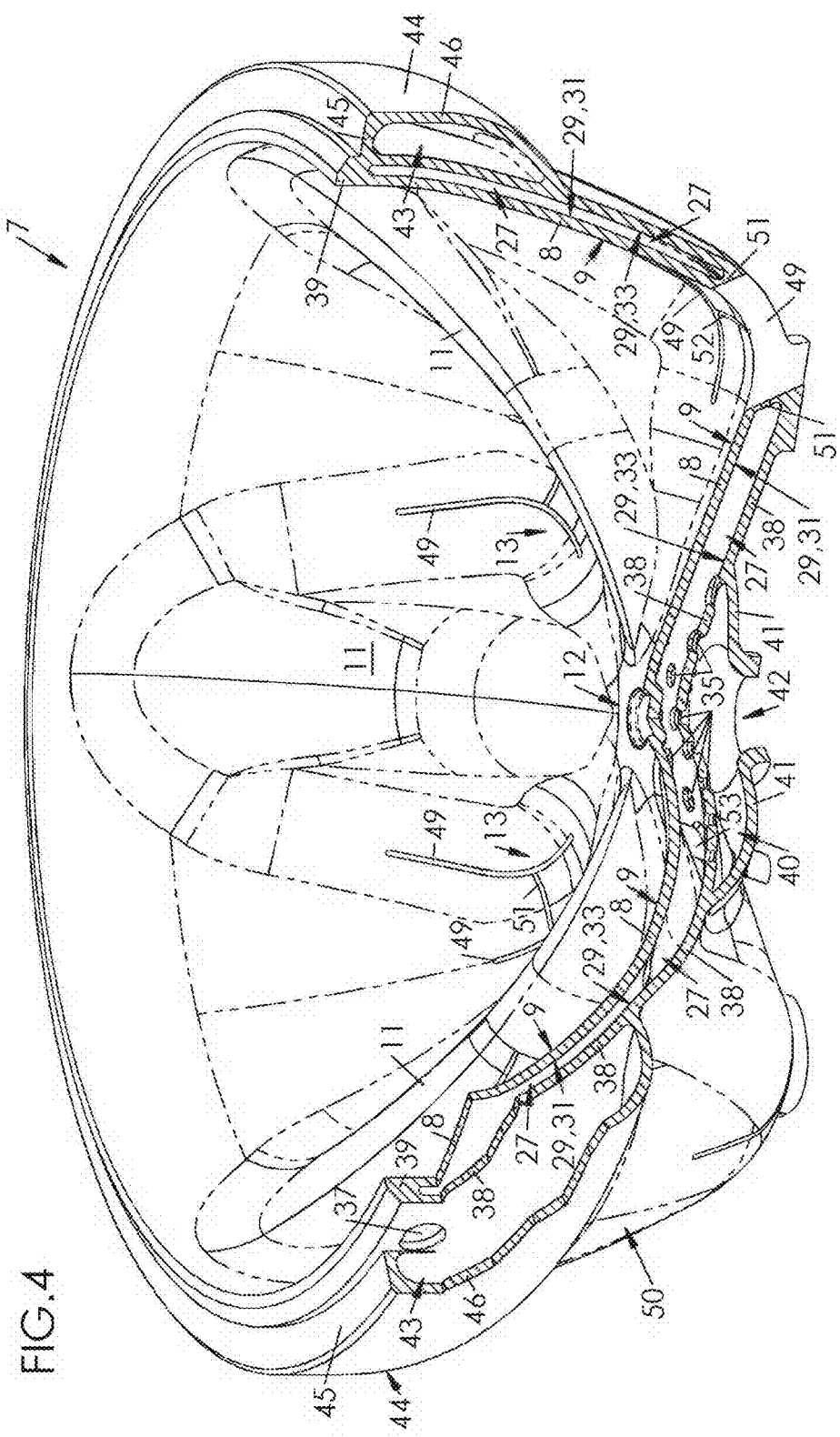
FIG. 4 is a partial perspective cutaway and detached view, of the mold bottom of FIG. 3, along the cutting line IV-IV.

In this case, the container to be formed has a petal-shaped bottom, which FIGS. 2, 3 and 4 clearly show. It is actually seen that the molding surface 9 of the mold bottom 7 is embossed and has, when examined in revolution around the central axis X of the mold, alternating ribs 11 (bearing the imprints of valleys on the petal-shaped bottom) that radiate from a central zone 12 that is adjacent to the X axis, and recessed reserved places 13 (bearing the imprints of feet on the petal-shaped bottom) that extend between the ribs 11. In the illustrated example, the number of ribs 11 (identical to the number of recessed reserved places 13) is five, but this number, purely illustrative, could be different.

It is therefore understood that the molding surface 9 of the mold bottom 7 is complex, i.e., it has no symmetry of revolution, although it can be composed (as in the illustrated example) of a circular repetition of the same pattern (here a rib 11 and a recessed reserve 13) around the X axis.

Likewise, although able to exhibit locally an invariance by rotation around the axis X of the mold, the molding surfaces 5 of the half-molds 3 are not symmetrical in revolution.

The mold 1 also comprises at least one fluid circuit 14, 15 for the circulation of a coolant in at least one of the mold elements 3, 7. The fluid can be water, or else oil; it can be injected into the circuit 14, 15 at a relatively low temperature (for example, on the order of 10° C.) to ensure cooling of the container at the end of the forming cycle, or by contrast at a high temperature (for example, on the order of 140° C.) to ensure heat-setting of the container at the end of the cycle, for the purpose of increasing its durability (i.e., the mechanical strength) by increasing crystallinity by thermal means, which thus makes it resistant to the heat stresses that arise during hot filling.

In the illustrated example, the mold 1 comprises a fluid circuit for each mold element: a first circuit 14 for each half-mold 3 and a second circuit 15 for the mold bottom 7.

Each circuit 14, 15 comprises a respective feed pipe 16, 17 and a respective drain pipe 18, 19, formed at least in part in the mold element 3, 7, for example by perforations.

The feed pipe 16 of each half-mold 3 and the feed pipe 17 of the mold bottom 7 respectively empty onto an outer surface 20 of the half-mold 3 and onto an outer surface 21 of the support into a respective intake opening 22, 23, through which the coolant is brought (for example through a connected feed tube on the stand 10 by means of a quick connection).

The drain pipe 18 of each half-mold 3 and the drain pipe 19 of the mold bottom 7 respectively empty onto the outer surface 20 of the half-mold 3 and onto the outer surface 21 of the support of a respective discharge opening 24, 25, through which the coolant is drained (toward a connected drain tube on the stand 10, for example by means of a quick connection) after having carried out a heat exchange with the container during forming, through the molding wall 4, 8.

FIG. 1 shows a feed pipe 16 and a drain pipe 18 for each half-mold 3, which pipes empty respectively through an intake opening 22 and a discharge opening 24 onto an outer surface 20 of the latter. On each half-mold 3, a feed hose can be connected to the intake opening 22, and a separate drain hose can be connected to the discharge opening 24. According to a particular embodiment, the intake opening 22 and the discharge opening 24 can be adjacent to allow the connection of a one-piece plug ensuring the function of both feeding fluid and draining fluid, as illustrated in the European patent application EP 2 043 840 (Sidel).

The or each fluid circuit 14, 15 also comprises, between the feed pipe 16, 17 and the drain pipe 18, 19, a cavity 26, 27 enclosed in the mold element 3, 7, in which the coolant circulates during the forming of the container to ensure the heat exchange with the latter.

This cavity 26, 27 is delimited by a surface casing 28, 29 that is integrally defined by the mold element 3, 7 (in this case each half-mold 3 or the mold bottom 7), i.e., the cavity 26, 27 is entirely delimited by the material of the mold element 3, 7, without being, even partially, delimited by a connected part.

The casing 28, 29 that delimits the cavity 26, 27 encloses:
An inner surface 30, 31 of the molding wall 4, 8, opposite to the molding surface 5, 9 and conforming to the raised pattern of the latter,
A rear surface 32, 33 opposite this inner surface 30, 31.
The rear surface 32, 33 is penetrated by at least two openings:
At least one intake opening 34, 35 through which the fluid coming from the feed pipe 16, 17 enters into the cavity 26, 27,
At least one discharge opening 36, 37 offset from the intake opening 34, 35 and through which the fluid that has circulated in the cavity 26, 27 exits from the latter in the direction of the drain pipe 18, 19.

FIG. 1 shows such a cavity 26 that is formed in each of the half-molds 3. This cavity 26 essentially conforms to the raised pattern of the molding surface 5 bearing the imprint of the body of the container, which makes possible a relatively homogeneous heat exchange over the entire body. Furthermore, it is seen in FIG. 1 that the molding wall 4 is relatively thin (and with an essentially uniform thickness, which is not a requirement), which enhances cooling (or heating) efficiency.

FIGS. 2 to 5 show the mold bottom 7 to illustrate in more detail the structure of its cavity 27. Thus, as is shown in FIG. 4, the cavity 27 essentially conforms to the raised pattern of the molding surface 9. It is seen that, in the embodiment shown, the molding wall 8 is thin in relation to general dimensions (in particular diameter and height) of the mold bottom 7. More specifically, according to a particular embodiment, the thickness of the molding wall 8 (measured perpendicular to any plane that is perpendicular to the molding surface 9) is between approximately 0.5 mm and 5 mm, preferably between 1 mm and 3 mm, and, for example, on the order of 1 mm in the illustrated example. This thickness, which depends on the heat conductivity of the material that is used, is suitable for maximizing the heat exchanges while minimizing the quantity of material necessary to the manufacturing of the mold bottom 7.

This thickness can be essentially constant, as in the example illustrated in FIG. 4 or 5, where the apparent thickness variations result from the cutting plane not coinciding, in certain places, with the perpendicular line to the molding surface 9 and therefore obliquely cutting the molding wall 8 into sections, in particular on the sides of ribs 11 corresponding to the valleys of the container (on the left in FIG. 5).

This embodiment corresponds to an objective of relative uniformity of heat exchanges with the material of the container in contact with the molding surface 9; nevertheless, it is possible to provide thickness variations of the molding wall 8, in particular for locally varying the quantity of calories exchanged between the coolant and the container, according to the desired heat profile. Thus, in the case of a cooling, it is possible to consider locally increasing the thickness of the molding wall 8 at right angles to the zones of the molding surface 9 corresponding to parts of the container requiring the removal of less heat. In contrast, it is possible to thin locally the molding wall 8 at right angles to the zones of the molding surface 9 corresponding to parts of the container requiring an increased cooling, for example in the center of the bottom of the container, where the material, which undergoes less stretching than the peripheral zones, remains relatively thick and amorphous.

As can be seen in FIGS. 4 and 5, the mold bottom 7, made from a single piece, has a secondary wall 38 that defines the rear surface 33. This secondary wall 38 preferably has a small thickness in relation to the general dimensions of the mold bottom 7. In the illustrated example, the thickness of the secondary wall 38 is between 0.5 mm and 5 mm, preferably between 1 mm and 3 mm, and, for example, on the order of 1 mm.

The molding wall 8 and the secondary wall 38 thus form two superposed layers that essentially conform to the raised pattern of the molding surface 9 and jointly delimit the cavity 27, their opposing surfaces 31, 33 defining the casing 29, for the most part its surface area.

The cavity 27 of the mold bottom 7 can be located at right angles to a limited zone of the molding surface 9 to limit the heat exchanges to such a limited zone; likewise, the cavity 26 of a half-mold 3 can be located at right angles to a limited zone of the molding surface 5. However, according to a preferred embodiment illustrated in the figures, the cavity 27 (or 26) is not localized and extends at right angles to the entire molding surface 9 (or 5) to allow a heat exchange with the entire bottom (or the body) of the container.

Thus, in the illustrated example, the inner surface 31 of the molding wall 8 (and therefore the cavity 27) essentially covers the entire molding surface 9. The cavity 27 extends to a junction between the walls 8, 38, in the area of an upper peripheral edge 39 of the mold bottom 7, where the molding surface 9 of the latter connects to the molding surface 5 of the half-molds 3.

According to a preferred embodiment, illustrated in FIGS. 4 and 5, the intake opening 35 is formed by a series of through holes made in the secondary wall 38. In the illustrated example, the mold bottom 7 comprises a distribution chamber 40 that adjoins the cavity 37 by being separated from the latter by a central portion of the secondary wall 38 in which the holes 35 that form the intake opening are made. The distribution chamber 40 is delimited, on the one hand, by this central portion of the secondary wall 38 and, on the other hand, by a side wall 41 that extends flaring like a bell, from a feed opening 42 centered on the X axis of the mold 1, by which the chamber 40 has a fluid connection to the feed pipe 17, to a junction of the side wall 41 with the secondary wall 38.

The discharge opening 37 comes in the form of at least one through hole made in the secondary wall 38. As can be seen in FIGS. 4 and 5, this hole 37 is advantageously formed along a radial axis in the vicinity of the upper peripheral edge 39 of the mold bottom 7.

According to a preferred embodiment, the mold bottom 7 is provided with a series of such holes 37, distributed over the periphery of the bottom 7, preferably perpendicular to the recessed reserved places 13 corresponding to the feet of the container. This arrangement makes it possible to force the fluid to circulate around the recessed reserves 13. Actually, because of their steep grade on the periphery of the bottom 7, the parts of the cavity 27 located at right angles to the recessed reserved places 13 seem more difficult for the fluid to access than the parts of the cavity 27 located perpendicular to the ribs 11, with gentler slopes.

Furthermore, the mold bottom 7 comprises at least one collector 43 into which at least one of the holes 37 empties. In the illustrated embodiment, a single collector is provided, into which each hole 37 empties. This collector 43 comes in the form of a peripheral annular hollow pipe. More specifically, the collector 43 encircles the secondary wall 38 by the outside, in the vicinity of the upper peripheral edge 39. As can be seen in FIGS. 4 and 5, the collector 43 is delimited on the inside by the secondary wall 38 and on the outside by an outside wall 44 that comprises an annular upper cross-section 45 that extends radially from the peripheral edge 39, and a lower cross-section 46 that first extends axially from the upper cross-section 45 and then in a curved manner toward the inside of the mold bottom 7 to connect to the secondary wall 38.

The mold bottom 7 also comprises at least one drop 47 (visible to the right in FIG. 5) into which the collector 43 empties. The or each drop 47 comes in the form of a hollow pipe adjacent to the secondary wall 38 along a rib 11, from the collector 43 to a drain opening 48 by which the drop 47 has a fluid connection to the drain pipe 19.

According to a preferred embodiment of FIG. 5, the feed opening 42 and the drain opening 48 are co-planar. In addition, the drain opening 48 is offset radially in relation to the feed opening 42, which is centered here on the X axis of the mold 1.

In the illustrated example, the mold bottom 7 comprises a single drop 47. As a variant, the mold bottom 7 can comprise two drops, for example diametrically opposite, or a series of drops that can be distributed angularly in a uniform manner at the periphery of the mold bottom 7. In this case, multiple drain pipes 19 can be formed in the support 10, with these pipes converging toward a single pipe from which the fluid that exits from the mold bottom 7 is drained.

According to an embodiment that is illustrated in FIGS. 2 to 4, the mold bottom 7 is equipped with pressure-release air vents 49, which make it possible, when the container is formed, to drain the air trapped between the latter and the molding surface 9.

As the figures clearly show, and in more detail in FIG. 4, each air vent 49 comes in the form of a continuous slot that completely passes through, simultaneously, the mold bottom 7, the molding wall 8, the cavity 37, and the secondary wall 38, to empty onto an outer surface 50 of the mold bottom 7. The air vent 49 does not empty into the cavity 27; the portion of the air vent 49 that extends through the cavity 27 is delimited by a wall 51 with a closed contour connecting the molding wall 8 to the secondary wall 38. This arrangement ensures a more effective release of pressure than the standard holes, whose flow rate is insufficient. In the embodiment illustrated in FIGS. 2, 3 and 4, the air vents 49 are formed in the recessed reserved places 13 corresponding to the feet of the container. Three air vents 49 are provided in the bottom of each recessed reserved place 13: two lateral air vents 49 that extend in the vicinity and along a junction between a rib 11 and a reserved place 13, and a median air vent 49 that extends between the lateral air vents 49, along a median line of the recessed reserved place 13. To distribute air in a relatively uniform manner between the air vents 49, the latter can be connected by a shallow, hollowed-out groove 52 in the molding surface 9 that links the air vents 49.

The circulation of the fluid in the mold bottom is illustrated by arrows in FIG. 5. The incoming fluid (which has not undergone heat exchange through the molding wall 8) is shown by black arrows; the outgoing fluid (which ended its heat exchange through the molding wall 8) is shown by white arrows, and the fluid circulating in the cavity 27 (during heat exchange through the molding wall 8) is shown by gray arrows.

The pressurized fluid coming from the feed pipe 17 enters into the mold bottom 7 via the feed opening 42. The incoming fluid first fills the distribution chamber 40. Then, it spreads out into the cavity 27 through the intake opening 35 in the cavity 27—and more specifically through holes 35 formed in the central zone of the secondary wall 38, as the black two-headed arrows of FIG. 5 suggest.

The pressurized fluid fills the cavity 27 and circulates from the holes 35 to the discharge opening 37 (or to the discharge openings 37), through which the fluid pours into the collector 43. In the cavity 27, the direction of circulation of the fluid is centrifugal because of the peripheral arrangement of the discharge opening 37 (discharge openings 37). It is easily understood that the fluid has its maximum heat capacity upon its entry into the cavity 27 (in the center of the mold bottom 7 in the illustrated embodiment). It gradually loses its heat capacity by circulating in the cavity 27, in such a way that the heat exchanges are less in the zones of the cavity 27 that are the farthest from the intake opening 35 (in the vicinity of the periphery of the mold bottom 7 in the illustrated embodiment).

This loss of heat capacity does not pose a real problem in the case of a cooling of the bottom of a container. Actually, the periphery of the bottom of the container undergoes an increased natural cooling during its blow molding, in comparison to its relatively thicker and less deformed central part. In other words, the periphery of the bottom requires less cooling (nearly several degrees) than the center.

Furthermore, the same is true in the case of a heat-setting of the bottom of a container. Actually, the periphery of the bottom, which undergoes a dual orientation (in the axial and radial directions), naturally has a higher crystallinity than that of the center, more amorphous because of its axial deformation alone. The periphery consequently requires a smaller heat input than the center even though they have a similar crystallinity level.

The one-piece configuration of the cavity 26, 27 (i.e., in the form of a single volume) makes it possible to circulate the fluid in an essentially homogeneous manner toward the zones that require a similar exchange of calories (for example, the recessed reserved places 13 corresponding to the feet).

It is conceivable to configure the cavity 27 in such a way that certain zones make possible an increased heat exchange or, conversely, a decreased heat exchange, according to a predetermined profile in which certain parts of the container should receive (or give) an increased (or, conversely, decreased) number of calories, regardless of the raised pattern of the molding surface 9.

By thinning the molding wall 8, it is possible to maximize the yield of heat exchanges. This makes it possible to save energy, to improve the quality of the containers produced, and to reduce the cycle time by limiting the period of contact of the container formed with the molding surface 9.

The one-piece production of the mold element 3, 7 (typically the mold bottom 7) in which the cavity 26, 27 is formed makes it possible to improve the sealing of the latter. Actually, the circulation of the fluid in the mold element 3, 7 is carried out in one and the same piece, whose different parts (in particular the molding wall 8 and the secondary wall 38 for the mold bottom 7) are formed from a single part. By contrast, the connection of the mold element 3, 7 to the feed pipe 16, 17 and to the drain pipe 18, 19 is to be made airtight, which can be done by means of simple O-ring seals or seals with lips.

The manufacturing of the mold element 3, 7 with its enclosed cavity 26, 27 can be done by direct manufacturing, preferably by the so-called direct additive laser construction technique, translation of the English terminology Direct Metal Laser Sintering (DMLS), which consists, by using a three-dimensional model of the element, in depositing successive layers of a metal powder and in carrying out, after each deposition, a local fusion of the powder by means of a power laser pointing toward the zones intended to form the material of the element to be manufactured. After the last pass, the thus manufactured element (or a parison of the latter) is extracted, while the residual (non-molten) powder is recovered for the purpose of subsequent reuse. The direct additive laser construction can be implemented within a machine such as the one marketed under the trade name EOSINT M 280 by the Electro Optical Systems Company.

This technique makes it possible in particular to produce the mold bottom 7 described above, with the cavity 27 totally enclosed in the material of the bottom 7 and conforming to the raised pattern of the molding surface 9, which cannot be done using ordinary manufacturing techniques by removing material, in particular by turning or milling. The direct manufacturing technique makes it possible to simplify and to accelerate the manufacturing of the mold elements 3, 7 by limiting the number of machines and machining operations. In practice, the complete manufacturing of the mold element 3, 7 comprises two successive operations: a first operation for direct manufacturing of a parison of the element 3, 7, and then a second operation for polishing the molding surface 5, 9 of the parison to obtain the final mold element 3, 7.

According to the direct manufacturing techniques used, and according to the shape of the cavity 26, 27, it may be appropriate to provide artifacts making it possible to ensure good structural rigidity (at least local) of the mold element 3, 7, without these artifacts having a significant impact on the functioning of the latter. In particular, in the example of the mold bottom 7 described above, it is possible to provide stiffeners 53 inserted between the molding wall 8 and the secondary wall 38, in such a way as to limit the risk of cracking due to thermal cycles and to mechanical stresses resulting from a pressure difference between the inside of the cavity 27 (where the fluid circulates at a pressure on the order of 6 to 7 bars), and the outside of the bottom 7, in particular beside the molding surface 9 (where the pressure exerted by the container during forming is between approximately 7 and 30 bars) or beside the outer surface 21, where the atmospheric pressure prevails.

These stiffeners 53 can come in the form of columns dispersed in the cavity 27 and connecting the secondary wall 38 to the molding wall 8. Such a column 53 is partially visible in FIG. 4. Distribution of these columns 53 can be done using a finite-elements simulation produced on the three-dimensional model of the mold element 3, 7, to place them in the zones where, according to the simulation, the mechanical stresses are concentrated.

As a variant, or in combination with these columns, the cavity 26, 27 can be at least locally stiffened by means of a three-dimensional network R connecting the inner surface 30, 31 of the molding wall 4, 8 to the rear surface 32, 33. Such a network R, illustrated diagrammatically in the detail inset of FIG. 5 in the case of the mold bottom 7, is porous and therefore does not prevent the fluid from circulating in the cavity 26, 27, even when a slowing of the flow due to the density of the network can be noted. The enclosing of such a three-dimensional network in the cavity 26, 27 can be carried out with no problem by the direct additive laser construction technique, as illustrated in the U.S. patent application US 2013/171019 (EOS).

It is consequently understood that the term "cavity" covers both an empty space defined inside the mold element 3, 7 and a space that, without being empty in the literal sense, remains porous like a filter to the point of letting a fluid (such as water or oil) flow relatively freely without generating a significant loss of feedstock.

As we have seen, the material used for the manufacturing of the mold element 3, 7 is preferably metal; it may also be steel or aluminum (optionally an alloy). In the case where the fluid circulating in the mold element 3, 7 is water, it is preferable that the material used for its manufacture be corrosion-resistant. Stainless steel will therefore advantageously be used, of which certain powder grades are available that are intended for direct additive laser construction (for example martensitic stainless steel referenced, as the European standard, under the numerical designation 1,4542 or under the symbolic designation X5CrNiCuNb16-4). Aluminum alloyed with silicon and with magnesium may also be suitable; by way of example, the alloy AlSi10Mg is available in powder form intended for direct additive laser construction.

Various variants can be provided.

Thus, a wear ring 54 can be integrated into the mold bottom 7. Such a wear ring 54 has the function of ensuring correct indexing of the mold bottom 7 in relation to the half-molds 3 by engagement with a complementary ring 55 that is integral with the half-molds, during their closing. The wear ring 54 concentrates the friction (and therefore the wear and tear) during the opening and closing movements of the mold 1. The wear ring 54 can be integrated into the stand 10. However, according to another embodiment illustrated in dotted lines in FIG. 5, this wear ring 54 is formed as a projection on the outer surface 50 of the mold bottom 7.

Furthermore, multiple independent cavities can be provided in the mold bottom 7, in which coolants of different temperatures can circulate. In this case, the mold bottom 7 can be equipped with multiple collectors (one for each cavity) and multiple drops (one for each collector). Multiple drops can furthermore be provided for the same collector so as to promote the draining of coolant. It is preferable, however, to make these drops converge toward the same drain pipe, which makes it possible to connect only a single drain tube to the stand 10.

The invention claimed is:

1. One-piece mold bottom (7) designed for a mold (1) for the manufacturing of containers by blow molding or stretch blow molding from preforms made of plastic material, with this mold bottom (7) comprising a molding wall (8) that has a raised molding surface (9) bearing the imprint of at least a portion of a container bottom, with this mold bottom (7) comprising a cavity (27) enclosed in the mold bottom (7), with this cavity (27) being delimited by a surface casing (29) integrally defined by the mold bottom (7) and enclosing an inner surface (31) of the molding wall (8), opposite to the molding surface (9) and conforming to the raised pattern of the latter, and a rear surface (33) opposite the inner surface (31), with the mold bottom (7) being equipped with at least one intake opening (35) and at least one discharge opening (37) for the circulation of a coolant in the cavity (27), wherein the rear surface (33) is carried by a secondary wall (38) that joins the molding wall (8) to a peripheral edge (39) of the mold bottom (7).

2. Mold bottom (7) according to claim 1, wherein the inner surface (31) of the molding wall (8) essentially covers the entire molding surface (9).

3. Mold bottom (7) according to claim 1, wherein the molding wall (8) has an essentially uniform thickness.

4. Mold bottom (7) according to claim 1, wherein the molding wall (8) has a thickness of between 0.5 mm and 5 mm.

5. Mold bottom (7) according to claim 4, wherein the molding wall (8) has a thickness of approximately 1 mm.

6. Mold bottom (7) according to claim 1, wherein the intake opening (35) is formed by a series of through holes (35) made in the secondary wall (38).

7. Mold bottom (7) according to claim 6, further comprising a distribution chamber (40) that adjoins the cavity (27) by being separated from the latter by a central portion of the secondary wall (38) in which the through holes (35) are made.

8. Mold bottom (7) according to claim 1, further comprising at least one collector (43) into which at least one discharge opening (37) empties.

9. Mold bottom (7) according to claim 8, wherein the collector (43) comes in the form of a peripheral annular pipe.

10. Mold bottom (7) according to claim 9, further comprising at least one drop (47) into which the collector (43) empties and which ends by a drain opening (48).

11. Mold bottom (7) according to claim 1, further comprising columns (53) and/or a three-dimensional network (R) that connects the inner surface (31) of the molding wall (8) to the rear surface (33).

12. Mold (1) for manufacturing containers from parisons made of plastic material, which comprises at least one mold bottom (7) according to claim 1.

13. Method for manufacturing a mold bottom (7) according to claim 1, which comprises a phase for obtaining a parison of the mold bottom (7) by direct fabrication from a metal powder.

14. Manufacturing method according to claim 13, wherein the parison of the mold bottom (7) is obtained by direct additive laser construction.

15. Mold bottom (7) according to claim 2, wherein the molding wall (8) has an essentially uniform thickness.

16. One-piece mold bottom (7) designed for a mold (1) for the manufacturing of containers by blow molding or stretch blow molding from preforms made of plastic material, with this mold bottom (7) comprising a molding wall (8) that has a raised molding surface (9) bearing the imprint of at least a portion of a container bottom, with this mold bottom (7) comprising a cavity (27) enclosed in the mold bottom (7), with this cavity (27) being delimited by a surface casing (29) integrally defined by the mold bottom (7) and enclosing an inner surface (31) of the molding wall (8), opposite to the molding surface (9) and conforming to the raised pattern of the latter, and a rear surface (33) opposite the inner surface (31), with the mold bottom (7) being equipped with at least one intake opening (35) and at least one discharge opening (37) for the circulation of a coolant in the cavity (27), and at least one collector (43) into which at least one discharge opening (37) empties, wherein the collector (43) comes in the form of a peripheral annular pipe.

17. Mold bottom (7) according to claim 9, further comprising at least one drop (47) into which the collector (43) empties and which ends by a drain opening (48).

\* \* \* \* \*